United States Patent [19]

Couturier

[11] Patent Number: 5,577,208
[45] Date of Patent: Nov. 19, 1996

[54] "MULTIMEDIA" INTERCOMMUNICATION BETWEEN WORKSTATIONS HAVING AUXILIARY UNIT DIRECTLY CONNECTED TO OUTPUT OF WORKSTATION AND INPUT TO DISPLAY WHEREIN LOCAL AND REMOTE IMAGE DATA ARE COMBINED

[75] Inventor: Patrice Couturier, Eaubonne, France

[73] Assignee: Alcatel NV, Netherlands

[21] Appl. No.: 902,905

[22] Filed: Jun. 23, 1992

[30] Foreign Application Priority Data

Jun. 25, 1991 [FR] France .................................. 91 07791

[51] Int. Cl.$^6$ .................................................. H01J 13/00
[52] U.S. Cl. ................ 395/200.04; 395/200.03; 395/822; 395/882; 395/884; 395/893
[58] Field of Search ..................... 395/200, 154, 395/153, 822, 882, 884, 893, 200.03, 200.04

[56] References Cited

U.S. PATENT DOCUMENTS

| | | | |
|---|---|---|---|
| 4,710,917 | 12/1987 | Tompkins et al. | 370/62 |
| 4,878,117 | 10/1989 | Ikehira et al. | 358/183 |
| 4,931,950 | 6/1990 | Isle et al. | 364/513 |
| 4,954,969 | 9/1990 | Tsumura | 364/521 |
| 5,179,651 | 1/1993 | Taaffe et al. | 395/154 |
| 5,230,041 | 7/1993 | Dinwiddie, Jr. et al. | 395/162 |
| 5,245,322 | 9/1993 | Dinwiddie, Jr. et al. | 395/115 |

FOREIGN PATENT DOCUMENTS 2642248  7/1990  France .

OTHER PUBLICATIONS

NTT Review vol. 1, No. 1, Mai 1989, Tokyo, JP, pp. 65–72; K. Hishiyama et al. "Private Digital Videotex Terminals".

IEEE International Conference on Communications '86; 22 Jun. 1986, Toronto, CA, pp. 1509–1513; S. Tsuruta et al., "Intelligent Communication Terminal for Integrating Voice, Data and Video Signals".

IEEE Global Telecommunications Conference vol. 1, 1 Dec. 1986, Houston, US, pp. 479–483. A. Sciarappa, "A Multi-medida Workstation with Real Time Capabilities in a Public Network (ISDN)".

Primary Examiner—Thomas C. Lee
Assistant Examiner—Sang Hui Kim
Attorney, Agent, or Firm—Robbins, Berliner & Carson

[57] ABSTRACT

A multimedia intercommunications installation suitable for conveying animated images between a plurality of users each provided with a microcomputer type of workstation. Each user is provided with a new central unit which processes the pixels for the screen directly. The new CPU receives and forwards data concerning animated images, sound, and writing. The writing data is advantageously generated by the writing members already provided for the workstation.

4 Claims, 2 Drawing Sheets

"MULTIMEDIA" INTERCOMMUNICATION BETWEEN WORKSTATIONS HAVING AUXILIARY UNIT DIRECTLY CONNECTED TO OUTPUT OF WORKSTATION AND INPUT TO DISPLAY WHEREIN LOCAL AND REMOTE IMAGE DATA ARE COMBINED

The present invention relates to a person-to-person intercommunication installation, said installation being a "multimedia" installation, i.e. suitable for transmitting not only animated or still images, but also voice and written data, and in either direction.

BACKGROUND OF THE INVENTION

There already exist so-called "video-conference" installations which are specialized intercommunication systems that can be called "multimedia" systems insofar as they transmit booth voice and animated images, and they are generally used in a single building between two conference rooms specially equipped for this purpose.

These known installations are of very limited use since they require users thereof to go to specialized video conference rooms, whereas it would be a great deal more practical for said users to be able to engage in multimedia dialog with other parties without having to leave their own offices.

One solution would be to provide an entire system specialized for this purpose, which would require each office to be equipped with a complete and specially adapted multimedia terminal. Although, a priori, such a solution is technically very satisfactory, it has the drawback of being extremely expensive both to implement and to run since it would require a special terminal complete with its own keyboard and screen to be installed in each office, whereas such an office is generally already fitted with a microcomputer, workstation, or the like, which also has a keyboard and a screen, so that it naturally appears desirable to use said keyboard and said screen for multimedia intercommunication without having to provide another keyboard and screen especially for this purpose.

Unfortunately, the use of such microcomputer or "PC" type workstations for multimedia intercommunication is, a priori, not possible. This is because:

all such workstations are not necessarily mutually compatible, either in terms of hardware or in terms of software; and the central units fitted in such workstations and the networks to which they are connected are not generally suitable for transmitting animated images, since such images require much too great a bit rate.

The invention seeks to solve these difficulties, and it thus proposes a multimedia intercommunications installation having, in particular, the capability of transmitting and receiving animated images, while nevertheless making it possible to use the screen and possibly also the keyboard or other writing means that is normally to be found in each commonplace personal workstation of the "PC" or microcomputer type.

SUMMARY OF THE INVENTION

To this end, the invention provides a "multimedia" intercommunication installation between a plurality of users each already possessing a workstation, e.g. of the microcomputer or "PC" type, having a screen, a central unit, and writing means including at least a keyboard, the installation comprising, per user, a special-purpose additional central unit or "CPU" and suitable at least for connecting itself directly to the screen of said workstation so as to process picture cells or "pixels" of said screen as a function of the desired multimedia intercommunication, and said new central unit also being suitable for receiving animated or still local camera means together with local writing means and local means for picking up and reproducing sound, thus making it possible over an interconnection link to perform the desired multimedia intercommunication between all of said users.

Preferably, said new central unit is also designed to connect directly to the keyboard and/or to any other possible writing means that already exist in the workstation of said user.

BRIEF DESCRIPTION OF THE DRAWINGS

An embodiment of the invention is described by way of example with reference to the accompanying drawings, in which.

DETAILED DESCRIPTION

Figure 2:
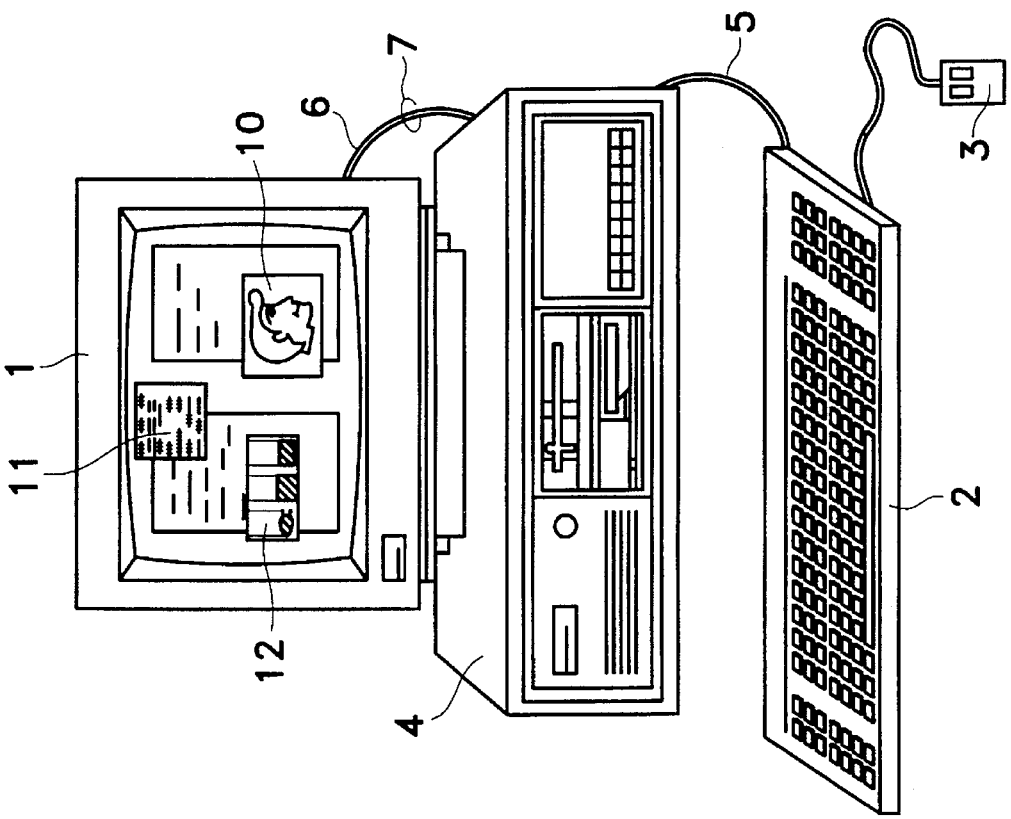
FIGS. 1 and 2 show one possible final appearance of the invention at the transmission end and at the reception end respectively.
Figure 1:
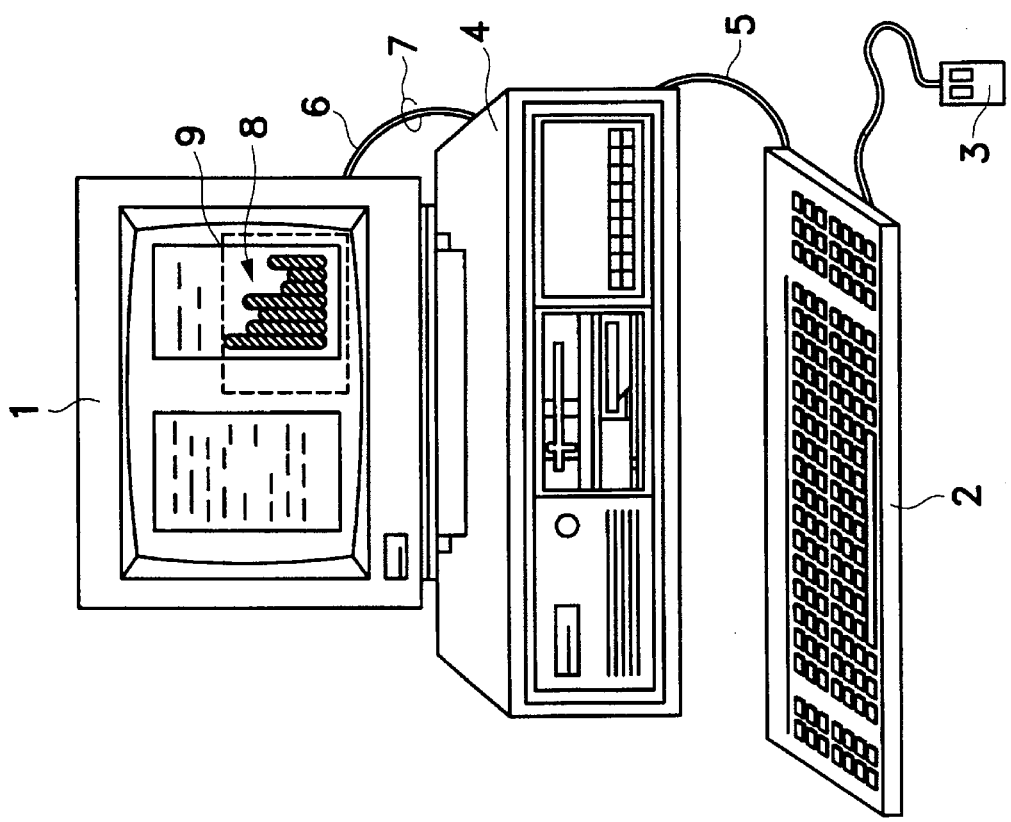

FIGS. 1 and 2 show a microcomputer or "PC" type work-station of the kind now commonly to be found in offices and indeed in the home. Such a workstation conventionally comprises a screen 1, a keyboard 2 optionally associated with a "mouse" or other writing member, and its own central unit 4 which is compatible only with certain other workstations having well-determined characteristics. The keyboard 2 is connected to the central unit 4 via a link 5 through which write data passes, and the central unit 4 is connected to the screen 1 via a link 6 through which image data or "pixels" pass.

The invention is based on the observation that if the link 6 which conveys only pixel data is "opened" at the point referenced 7, and if some other logic control unit is inserted at this position, then this other logic control unit is in a position to act freely and at a high data rate on said pixels independently of the original central unit 4. For example, as shown diagrammatically in FIG. 1, the additional control unit may select an image 8 in a defined window 9 on the screen and extract said image 8 for transmission over a telephone line to another logic control unit of the same type associated with another screen, which can likewise be merely a microcomputer screen. It is also possible, as shown diagrammatically in FIG. 2, to replace pixels coming from the normal central unit 4 with other data, e.g. located in a predefined window on the screen 1 using so-called picture in picture (PIP) mode. The other data may, for example, be:

a still or animated image 10, in which case the rate at which the external unit is capable of injecting pixels to the microcomputer screen 1 must be compatible with the high rates required by animated images;

a word processor 11;

a spreadsheet 12;

etc.

Figure 3:
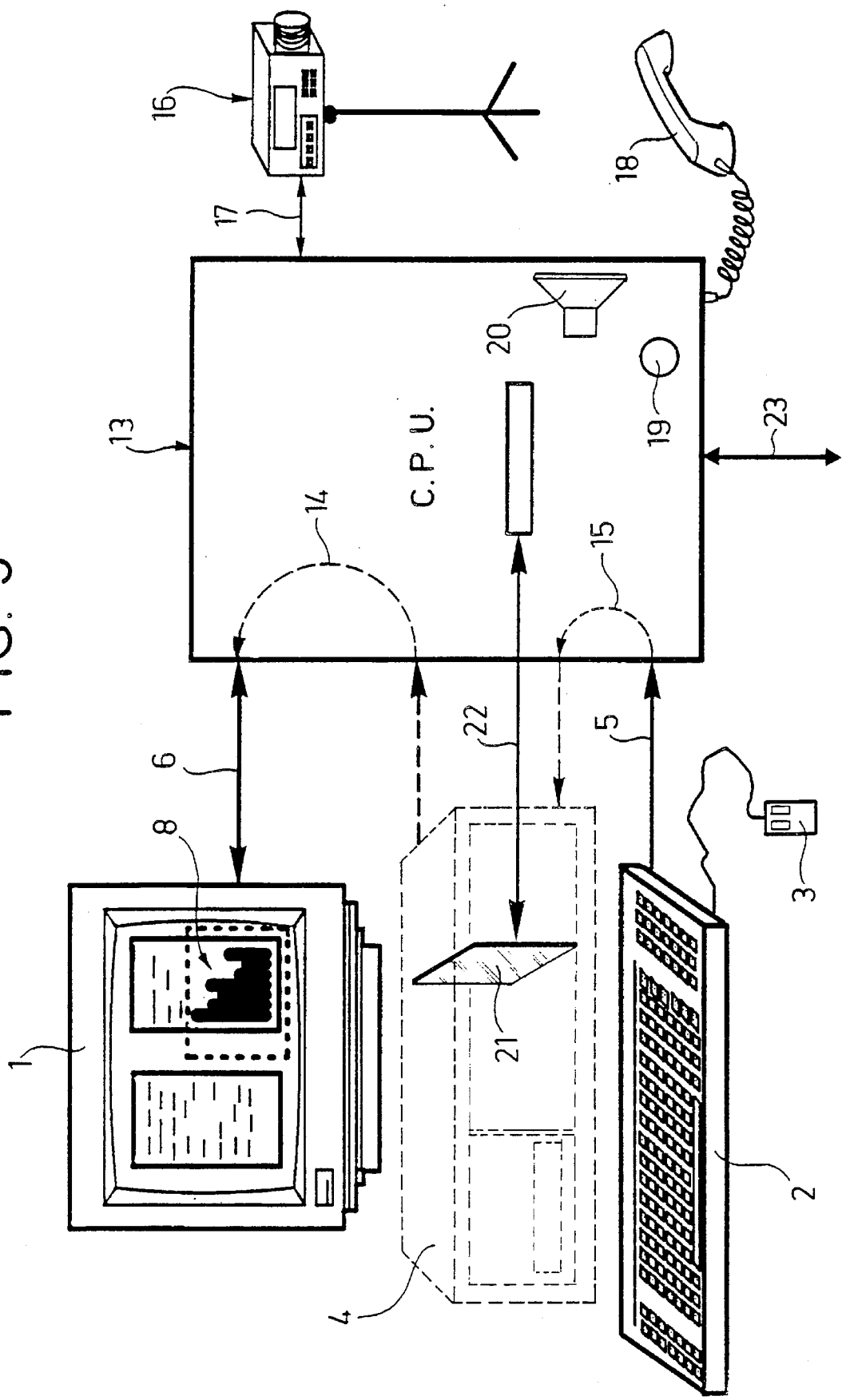
FIG. 3 is a block diagram of the installation, showing one user terminal only.

One particular implementation based on this principle is shown in FIG. 3. This installation comprises one special central unit (CPU) 13 per user, which unit has a two-way connection to the screen 1 that the user already possesses, i.e. the screen of the user's microcomputer, thereby enabling it to inject or extract the desired pixels.

The central unit 4 is, for this particular purpose, no longer involved and it is consequently shown in dashed lines. As shown, the new central unit 13 is interposed on the link wire 6 between the unit 4 and the screen 1, and also on the link wire 5 between the keyboard 2 and the unit 4.

Facilities for direct through connections 14 and 15 under the control of the new unit 13 are provided so that the user can continue to use the microcomputer independently as before.

The new central unit 13 receives and retransmits not only pixels that relate to the above-mentioned image 8 previously applied to the screen under the control of the keyboard 2, but also user-input or "writing" data from the keyboard 2 or from the mouse 3, still or animated image data sensed locally by a camera 16 and transmitted over a link 17, and voice data sensed, transmitted, and reproduced either by a telephone handset 18 or by a hands-free circuit including a microphone 19 and a loudspeaker 20.

In the design of the invention, the new central unit 13 therefore takes over from the unit 4 during a person-to-person multimedia call, and is also provided with facilities for receiving other data (camera 16, handset 18, . . . ). One new central unit 13 is therefore normally provided per user in an installation. The new units 13 is connected to the other new central unit of other users over a line 23 in such a manner as to provide two-way transmission and reception of all types of data.

An additional convenience consists in taking account of any commercially-available standard local network cards that are to be found in the central unit 4 of the microcomputer by means of a link 22 which is connected to the new unit 13. This enables the old unit 4 to communicate with other such units via the new unit 13 and the line 23.

It should also be observed that use of the keyboard 2 and the screen 1 in combination with the new central unit 13 makes it possible to create a "terminal-X" for a user suitable for acting as a window server over the interconnection link 23.

Naturally, the invention is not limited to the embodiment described above, and, on the contrary, it is suitable for being implemented in numerous different variants and embodiments that may be equivalent or that may provide additional facilities.

I claim:

1. A multimedia intercommunication installation between a plurality of users, said installation including for each of said users:

a workstation having a screen, a main processing unit providing a source of local image data, data input means including at least a keyboard for providing a source of control data, and an auxiliary processing unit directly connected between an output of the main processing unit and an input of the screen for supplying said screen with a video image derived at least in part from said local image data, said auxiliary processing unit comprising data input means for selectively receiving said control data from said keyboard to thereby define a desired multimedia intercommunication, auxiliary image input means for connection to a source of remote image data, pixel output means responsive to said local image data, to said remote image data and to said control data, for supplying said screen with said processed video image in the form of pixel data incorporating at least portions of both said local image data and said remote image data for simultaneous display of the screen in accordance with said desired multimedia intercommunication, and interconnection means including an interconnection for selectively transmitting the local image data to another said workstation and for receiving the remote image data from that other workstation.

2. An installation according to claim 1, wherein said auxiliary processing unit further comprises means for directly reconnecting the main processing unit to the screen.

3. An installation according to claim 1, wherein the auxiliary processing unit further comprises means for connecting said keyboard either directly to the auxiliary processing unit or else to the main processing unit.

4. An installation according to claim 1, wherein the keyboard, the screen and the main processing unit function as a window server.

* * * * *